United States Patent [19]

Camillo

[11] Patent Number: 4,709,511
[45] Date of Patent: Dec. 1, 1987

[54] CLAMP FOR LOCK KEY DUPLICATING MACHINE

[75] Inventor: Bianchi Camillo, Conegliano, Italy

[73] Assignee: SILCA S.p.A., Treviso, Italy

[21] Appl. No.: 836,425

[22] Filed: Mar. 5, 1986

[30] Foreign Application Priority Data

Mar. 6, 1985 [IT] Italy ................ 84111 A/85

[51] Int. Cl.$^4$ ............................................ B24B 41/06
[52] U.S. Cl. ........................... 51/216 R; 51/98 R; 269/254 CS; 269/88
[58] Field of Search ............ 51/216 R, 216 P, 217 R, 51/217 P, 217 A, 218 R, 218 P, 98 R; 269/254 CS, 88

[56] References Cited

U.S. PATENT DOCUMENTS

| | | | |
|---|---|---|---|
| 2,114,757 | 4/1938 | Yerkes | 51/98 R |
| 2,437,927 | 3/1948 | Becker | 51/236 |
| 2,604,739 | 7/1952 | Evans | 51/236 |
| 3,507,169 | 4/1970 | Signer | 51/216 R |
| 3,941,363 | 3/1976 | Ogg | 51/217 R |

*Primary Examiner*—Frederick R. Schmidt
*Assistant Examiner*—Robert A. Rose
*Attorney, Agent, or Firm*—Charles W. Fallow; Martin P. Hoffman

[57] ABSTRACT

A clamp for duplicating machines for lock keys comprising a pair of jaws (1,1',2,2') which are mounted on a threaded pin (4) rigid with a clamp support carriage (3), means for approaching said two jaws (1,1', 2,2') when clamping the key, and elastic means (8,6) interposed between said two jaws (1,1', 2,2') to keep them spaced apart. The clamp comprises, in a position misaligned with the line of action of the applied clamping force and at the opposite side with repect to the gripping faces of the jaws (1,1', 2,2'), a projecting portion causing, during the clamping stage, a moment opposite to the reaction moment caused by the clamped key.

8 Claims, 3 Drawing Figures

CLAMP FOR LOCK KEY DUPLICATING MACHINE

This invention relates to a clamp for duplicating machines for lock keys.

Clamps for lock key duplicating machines are known. They generally comprise a fixed jaw rigid with the duplicating machine carriage, and a mobile jaw which can be moved towards the fixed jaw in order to clamp against this the key being cut. Generally, both jaws are traversed centrally by a threaded pin which is rigid with the clamp support carriage of the duplicating machine and is provided with a clamping handgrip. Elastic systems, generally of the spring type, are interposed between the two jaws, their purpose being to aid the withdrawal of the mobile jaw from the fixed jaw in order to facilitate release of the key when cut.

One drawback of these known clamps is that their clamping action is exerted by a portion of the jaw which is not aligned with the line of action of the applied clamping force, and this results in a reaction moment which frequently causes sticking between the two jaws during the clamping stage, and consequent opening difficulties during the release stage.

A further drawback of these known clamps is that possible misalignment defects of the components parts coupled with inexact parallelism of the faces of the key being cut make the clamping imperfect. This is a further cause of clamp sticking, tool vibration, imprecise cutting, and in some cases even tool breakage.

A further drawback of these known clamps is that, as is often required, in order to be able to clamp keys only along longitudinal grooves which may be provided on both the key faces, the clamps have to have both their jaws provided with ribs for engaging said grooves. As it is practically impossible for the grooves provided on the two key faces to be engaged simultaneously by the jaw ribs, and in addition as the keys often contain only one groove, the rib which does not engage a groove generally results in an imprecise and unstable grip which prevents clamping of the key by the clamp.

The object of the invention is to obviate these drawbacks by providing a clamp which prevents any sticking between the mobile jaw and fixed jaw, and which provides reliable clamping for keys of any type (flat, cross-shaped, etc.), even those with parallelism errors.

A further object of the invention is to provide a clamp which allows reliable clamping with the application of limited force.

These objects are attained according to the invention by a clamp for duplicating machines for lock keys comprising a pair of jaws which are mounted on a threaded pin rigid with a clamp support carriage, means for approaching said two jaws when clamping the key, elastic means interposed between said two jaws to keep them spaced apart characterised in that it comprises, in a position misaligned with the line of action of the applied clamping force, and at the opposite side with respect to the gripping faces of the jaws, a projecting portion causing, during the clamping stage, a moment opposite to the reaction moment caused by the clamped key.

Advantageously, the two jaws can be reversed in a horizontal plane and turned upside down in a vertical plane, and are provided on one side with a pair of flat faces and on the other side with a pair of faces of which one is flat and one comprises a rib for engaging corresponding grooves provided in the key being cut.

Two preferred embodiments of the present invention are described in detail hereinafter with reference to the accompanying drawings, in which.

Figures 1, 2, 3:
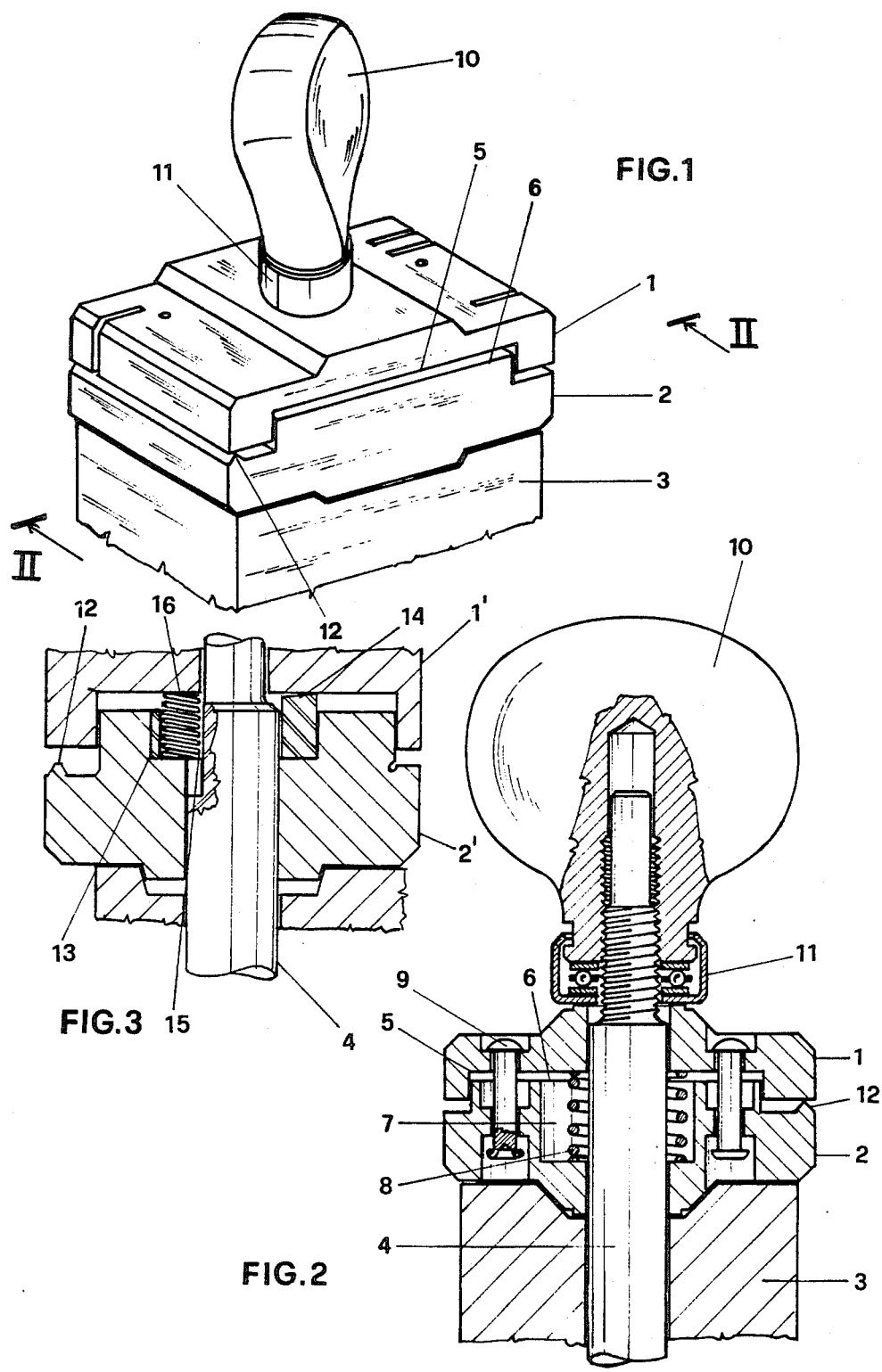
FIG. 1 is a perspective view of a clamp according to the invention.
FIG. 2 is a vertical section therethrough on the line II—II of FIG. 1.
FIG. 3 is a partial view of the clamp in a second embodiment.

As can be seen from the FIGS. 1 and 2, the clamp according to the invention comprises two jaws 1 and 2 which can be fitted together by insertion. The outer profile of both the jaws is identical and complementary to the profile of the clamp support carriage 3, by which they are held, in order to enable the clamp to be turned upside down on the carriage 3. This profile is also symmetrical about a transverse vertical plane to enable the clamp to be rotated through 180° about the pin 4 which fixes it to the carriage 3, so as to position one or the other pair of gripping faces towards the duplicating machine tool, this tool not being shown on the drawings but assumed to be on the left hand side with respect to the observer.

The two jaws 1 and 2 are engaged with each other by insertion, and this engagement is obtained by providing a rectangular recess 5 in the jaw 1 (female jaw), and a complementary appendix 6 on the jaw 2 (male jaw). In addition the male jaw 2 is provided with a circular recess 7 coaxial to the pin 4 for housing a spiral spring 8, which tends to keep the two jaws 1 and 2 elastically spaced-apart by the distance allowed by two rivets 9 which prevent total separation of said jaws, and which in any event are such as to ensure engagement between the recess 5 and appendix 6.

The pin comprises a cylindrical portion of height slightly greater than the total height of the two jaws 1, 2 when in their state of maximum mutual withdrawal. It also comprises a central threaded portion and a further non-threaded end portion. An operating handgrip 10 of anatomical configuration is screwed on to the threaded central portion and is provided, in the zone in which it rests on the clamp, with a bearing 11 which facilitates the clamping and release operations of the clamp.

As stated, the two jaws 1, 2 comprise two pairs of faces, with which they can clamp a key. The two faces of one pair, namely those shown on the left in the drawings, facing the tool, are flat and parallel, whereas of the two faces of the other pair one is flat and the other comprises a rib 12.

As explained hereinafter, in the clamp according to the invention, in order to allow effective clamping action, on the side comprising the pair of flat faces, the height of the appendix 6 is greater than the depth of the recess 5, whereas on the other side the depth of the recess 5 is greater than the difference between the height of the appendix 6 and the height of the rib 12.

The operation of the clamp according to the invention is as follows: when the handgrip 10 is in its slackened state, it is completely unscrewed from the threaded portion of the pin 4, but because of the existence of the non-threaded end portion of this latter, the handgrip is properly retained in its correct position for the next clamping operation.

In this state, the spring 8 keeps the two jaws 1 and 2 spaced apart by a distance determined by the rivets 9, i.e., a distance sufficient to allow the key being cut to be inserted between the two jaws.

Assuming a key with only one toothed edge is to be cut, the clamp is used in the configuration shown in FIG. 2. In this case, the key is disposed between the two left hand faces of the jaws 1, 2 and its straight edge rests against the lateral wall of the appendix 6, i.e., against the end of the seat defined by the two jaws 1, 2.

The handgrip 10 is then operated, by screwing it down on the threaded portion of the pin 4, to cause the two jaws 1, 2 to approach each other and the spring 8 to undergo compression. As the two jaws 1, 2 move towards each other, they clamp the key on the tool side, whereas on the opposite side, provided there is no obstacle, they continue to approach each other. Because of the fact that the depth of the recess 5 is greater than the difference in height between the appendix 6 and rib 12, this rib comes into contact with the opposing jaw before the appendix 6 touches the base of the recess 5, and in this manner the clamp acts as a pair of third class levers, with the power applied along the axis of the pin 4, the resistance applied at the key to be cut, and the fulcrum at the rib 12.

Because of the play which exists between the jaws 1, 2 and the pin 4, any sticking phenomena or difficulty in releasing the clamp on termination of cutting is obviated.

If however a key with both its edges toothed is to be cut, the two jaws 1, 2 are previously rotated through 180° about the pin 4, so as to present the faces on the rib side to the tool. After this preliminary operation, if the groove in the key faces downwards the key can now be clamped. If not, the clamp must firstly be turned upside down so that the two jaws assume a position which is inverted with respect to that shown in FIG. 2.

The handgrip 10 is then operated to bring the two jaws together until they adhere to the key to be cut on the tool side. On the opposite side, with no key present, the two jaws continue to approach each other, and in this case because the height of the appendix 6 is greater than the depth of the recess 5, the base of said appendix 6 reaches the base of the recess 5 before the pair of jaws which are not clamping the key come into contact with each other.

Again in this case the clamp therefore acts as a pair of third class levers, with the power applied along the axis of the pin 4, the resistance applied at the key to be cut, and the fulcrum positioned on the line of contact between the appendix 6 and the base of the recess 5.

From the aforegoing, it is clear that the clamp according to the invention offers numerous advantages, and in particular:

it prevents any sticking between the two jaws 1, 2 and pin 4 during the clamping stage, and thus any difficulty in mutual separation during the release stage, it allows the exertion of a powerful clamping action for a small applied force, because of the substantial distance between the axis of the pin 4 and the fulcrum of the two levers. Moreover, the force is easily applied because of the anatomical configuration of the handgrip, it allows a single rib 12 to be provided, this cooperating with a facing flat surface which makes the clamping action effective and reliable, it retains the handgrip 10 on the pin 4 even when completely unscrewed, thus simplifying the next clamping stages and making it quicker to carry out.

In the embodiment shown in FIG. 3 the jaw 2' is provided, near its upper surface, with a circular recess 13, coaxial to the pin 4, for housing an annular wedge-shaped washer 14. This washer rests with its lowre surface, perfectly orthogonal to the axis of the pin 4, on the bottom of the circular recess 13, and it has the upper surface inclined with respect to the lower one. Furthermore the washer 14 is provided with a seat 15, parallel to the axis of the same washer, but eccentrically placed with respect to this; this seat 15 houses a spiral spring 16 which tends to keep the two jaws 1' and 2' elastically spaced apart. Really the seat 15 of the spring 16 is not only provided in the washer 14 but is partly cut in the pin 4, so that the spring 16 keeps the washer 14 rotationally engaged with the pin 4. Furthermore the mutual position of the parts is such that the washer 14 has its largest thickness in the opposite side of the portion of the clamp faced in the machine tool, assumed to be on the left hand side with respect to the observer, while the spring 16 is diametrically in the opposite position.

The operation of the clamp in this embodiment is as follows: the key is disposed between the two left hand faces of the jaws 1' and 2' and subsequently the handgrip 10 is operated to cause the two jaws 1',2' to approach to each other. During this phase, due to the presence of the wedge-shaped washer 14, besides the mutual approach of the two jaws 1' and 2', also a moment occurs opposing the moment caused by the reaction of the key to the same clamping, and therefore the jaw 1' does not undergo any misalignment or consequent sticking.

I claim:

1. A clamp for lock key duplicating machines comprising
    a clamp support carriage,
    a theaded pin rigid with the carriage and extending therefrom,
    a pair of jaws mounted upon said pin,
    means for drawing the two jaws together and to clamp a key therebetween said means applying clamping force along a line of action,
    elastic means interposed between the two jaws to bias them apart, and
    one of said jaws having a projecting portion in a position misaligned with said line of action and offset therefrom in a direction away from the gripping faces of the jaws thereby to create a moment opposite to the reaction moment produced by the clamped key,
    characterized in that the projecting portion consists of an appendix (6) provided on one jaw (2) and which is received within a corresponding recess (5) provided on the other jaw (1), the depth of the recess (5) at the corresponding faces on the side comprising the rib (12) being greater than the difference in height between the appendix (6) and the rib (12), and the depth of the recess (5) at the corresponding faces on the side not comprising the rib (12) being less than the height of the appendix (6).

2. A clamp according to claim 1, wherein one of said jaws has a circular recess (7,13) coaxial to the pin (4) and further comprising
    a pair of stop elements limiting total separation of said jaws thus maintaining engagement between the recess and the appendix, and
    a spring (8,16) which keeps the two jaws spaced apart to the extent allowed by the stop elements (9).

3. A Clamp according to claim 2, characterized in that the spring (8) is coaxial to the pin (4).

4. A clamp according to claim 1 wherein the projecting portion comprises a washer (14) interposed between the two jaws (1',2'), coaxial to the pin (4) and having their level surfaces converging so that the largest thickness of the washer (14) is offset toward the opposite side of the pin with respect to the gripping faces of the jaws (1',2').

5. A clamp according to claim 4 wherein the washer (14) is rotationally bound to the pin (4) and wherein the two jaws (1',2') are rotationally free with respect to this washer (14) in order to enable one to change the orientation of gripping faces with respect to the machine tool.

6. A clamp according to claim 2 characterized in that the spiral spring (16) has its axis parallel to that of the pin (4) and is housed in a seat (13) provided partly in the pin (4) and partly in that part of the washer (14) having the smallest thickness.

7. Clamp according to claim 1 characterized in that the means causing the clamping of the jaws (1,1',2,2') is an anatomic-shaped handgrip (10) which can be screwed on the threaded portion of the pin (4).

8. Clamp according to claim 1, characterised in that the base of the handgrip (10) in contact with that jaw (1,1') which is distant from the clamp support carriage (3) is provided with a ball bearing (11).

* * * * *

UNITED STATES PATENT AND TRADEMARK OFFICE
CERTIFICATE OF CORRECTION

PATENT NO. : 4,709,511

DATED : December 1, 1987

INVENTOR(S) : Camillo Bianchi

It is certified that error appears in the above-identified patent and that said Letters Patent is hereby corrected as shown below:

Cover page, Item [19]:   change "Camillo" to --Bianchi--.

Item [75]:   change "Bianchi Camillo" to --Camillo Bianchi--.

Signed and Sealed this

Eighth Day of March, 1988

Attest:

DONALD J. QUIGG

Attesting Officer

Commissioner of Patents and Trademarks